United States Patent
Novakovic et al.

(10) Patent No.: US 10,698,878 B2
(45) Date of Patent: Jun. 30, 2020

(54) GRAPH UPDATE FLUSH TO A SHARED MEMORY

(71) Applicant: Hewlett Packard Enterprise Development LP, Houston, TX (US)

(72) Inventors: Stanko Novakovic, Palo Alto, CA (US); Kimberly Keeton, San Francisco, CA (US); Paolo Faraboschi, Palo Alto, CA (US); Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 395 days.

(21) Appl. No.: 15/556,238

(22) PCT Filed: Mar. 6, 2015

(86) PCT No.: PCT/US2015/019232
§ 371 (c)(1),
(2) Date: Sep. 6, 2017

(87) PCT Pub. No.: WO2016/144299
PCT Pub. Date: Sep. 15, 2016

(65) Prior Publication Data
US 2018/0025043 A1    Jan. 25, 2018

(51) Int. Cl.
*G06F 16/23* (2019.01)
*G06F 16/901* (2019.01)
*G06F 16/27* (2019.01)

(52) U.S. Cl.
CPC ........ *G06F 16/2358* (2019.01); *G06F 16/273* (2019.01); *G06F 16/9024* (2019.01)

(58) Field of Classification Search
CPC ............ G06F 16/2358; G06F 16/9024; G06F 16/273; G06F 17/30368; G06F 17/30578; G06F 17/30958
See application file for complete search history.

(56) References Cited

U.S. PATENT DOCUMENTS

| | | |
|---|---|---|
| 7,725,505 B2 | 5/2010 | Boney et al. |
| 7,958,120 B2 * | 6/2011 | Muntz ................... G06Q 10/00 707/736 |

(Continued)

FOREIGN PATENT DOCUMENTS

| | | |
|---|---|---|
| WO | WO-2013149381 | 10/2013 |
| WO | WO-2013177660 | 12/2013 |

OTHER PUBLICATIONS

International Searching Authority, The International Search Report and the Written Opinion, dated Feb. 19, 2016, 9 Pages.

(Continued)

*Primary Examiner* — Kostas J Katsikis (57) ABSTRACT

In some examples, a graph processing server is communicatively linked to a shared memory. The shared memory may also be accessible to a different graph processing server. The graph processing server may compute an updated vertex value for a graph portion handled by the graph processing server and flush the updated vertex value to the shared memory, for retrieval by the different graph processing server. The graph processing server may also notify the different graph processing server indicating that the updated vertex value has been flushed to the shared memory.

14 Claims, 6 Drawing Sheets

(56) References Cited

U.S. PATENT DOCUMENTS

| | | | |
|---|---|---|---|
| 8,478,800 B1 | 7/2013 | Johnson et al. | |
| 8,667,329 B2 | 3/2014 | Douros et al. | |
| 8,938,599 B2* | 1/2015 | Lee | G06F 12/0284 345/543 |
| 10,191,948 B2* | 1/2019 | Vemuri | G06F 16/24554 |
| 2004/0073529 A1* | 4/2004 | Stanfill | G06F 9/4494 706/45 |
| 2006/0271395 A1* | 11/2006 | Harris | G06F 9/52 718/1 |
| 2008/0098375 A1* | 4/2008 | Isard | G06F 9/5066 717/149 |
| 2009/0030863 A1* | 1/2009 | Stanfill | G06F 9/466 706/45 |
| 2009/0097418 A1* | 4/2009 | Castillo | H04L 41/12 370/255 |
| 2009/0327196 A1 | 12/2009 | Studer et al. | |
| 2010/0241827 A1* | 9/2010 | Yu | H04L 12/44 712/30 |
| 2010/0241828 A1* | 9/2010 | Yu | G06F 8/456 712/30 |
| 2010/0281071 A1 | 11/2010 | Ben-Zvi | |
| 2011/0113210 A1* | 5/2011 | Klapman | G06F 3/061 711/163 |
| 2011/0321031 A1 | 12/2011 | Dournov et al. | |
| 2012/0158858 A1* | 6/2012 | Gkantsidis | H04L 51/22 709/206 |
| 2012/0179674 A1* | 7/2012 | Delling | G01C 21/3446 707/736 |
| 2012/0304192 A1* | 11/2012 | Grove | G06F 9/5083 718/105 |
| 2012/0317142 A1* | 12/2012 | Broecheler | G06F 16/9024 707/770 |
| 2013/0132369 A1* | 5/2013 | Delling | G01C 21/3446 707/716 |
| 2013/0222388 A1* | 8/2013 | McDonald | G06F 16/9024 345/440 |
| 2013/0246731 A1* | 9/2013 | Lee | G06F 12/0284 711/170 |
| 2013/0332667 A1 | 12/2013 | Uchigaito et al. | |
| 2014/0019490 A1 | 1/2014 | Roy et al. | |
| 2014/0118366 A1* | 5/2014 | Hakura | G06T 17/20 345/506 |
| 2014/0137129 A1* | 5/2014 | Jacob | G06F 9/46 718/103 |
| 2014/0320497 A1* | 10/2014 | Vojnovic | G06T 11/206 345/440 |
| 2014/0354649 A1* | 12/2014 | Aksu | G06K 9/00 345/440 |
| 2015/0006316 A1* | 1/2015 | Zhou | G06Q 10/04 705/26.7 |
| 2015/0095182 A1* | 4/2015 | Zhou | H04N 21/4668 705/26.7 |
| 2015/0117216 A1* | 4/2015 | Anand | H04L 47/125 370/236 |
| 2015/0138203 A1* | 5/2015 | Nachmanson | G06T 11/206 345/440 |
| 2015/0186427 A1* | 7/2015 | Logothetis | G06F 16/9024 707/776 |
| 2016/0063037 A1* | 3/2016 | Savkli | G06F 16/532 707/722 |
| 2016/0071233 A1* | 3/2016 | Macko | G06F 16/9024 345/440 |
| 2016/0124841 A1* | 5/2016 | Nito | G06F 12/0238 711/102 |
| 2016/0125093 A1* | 5/2016 | Cho | G06F 16/9024 707/798 |
| 2016/0140152 A1* | 5/2016 | Sevenich | G06F 16/24 707/755 |
| 2018/0025043 A1* | 1/2018 | Novakovic | G06F 16/2358 707/613 |

OTHER PUBLICATIONS

Tian, Y. et al.; "From 'Think Like a Vertex' to 'Think Like a Graph'"; 2013; 12 pages.

Apache Giraph, "Welcome to Apache Giraph", available online at <https://web.archive.org/web/20150225172113/http://giraph.apache.org/>, Feb. 25, 2015, 1 page.

Malewicz et al., "Pregel: a system for large-scale graph processing", Proc. ACM SIGMOD International Conference on Management of Data, Jun. 6-11, 2010, 11 pages, Indiana, USA.

* cited by examiner

GRAPH UPDATE FLUSH TO A SHARED MEMORY

BACKGROUND

With rapid advances in technology, computing systems are increasingly prevalent in society today. Vast computing systems execute and support applications that may communicate and process immense amounts of data, many times with performance constraints to meet the increasing demands of users. Increasing the efficiency, speed, and effectiveness of computing systems will further improve user experience.

BRIEF DESCRIPTION OF THE DRAWINGS

Certain examples are described in the following detailed description and in reference to the drawings.

DETAILED DESCRIPTION

Figure 1:
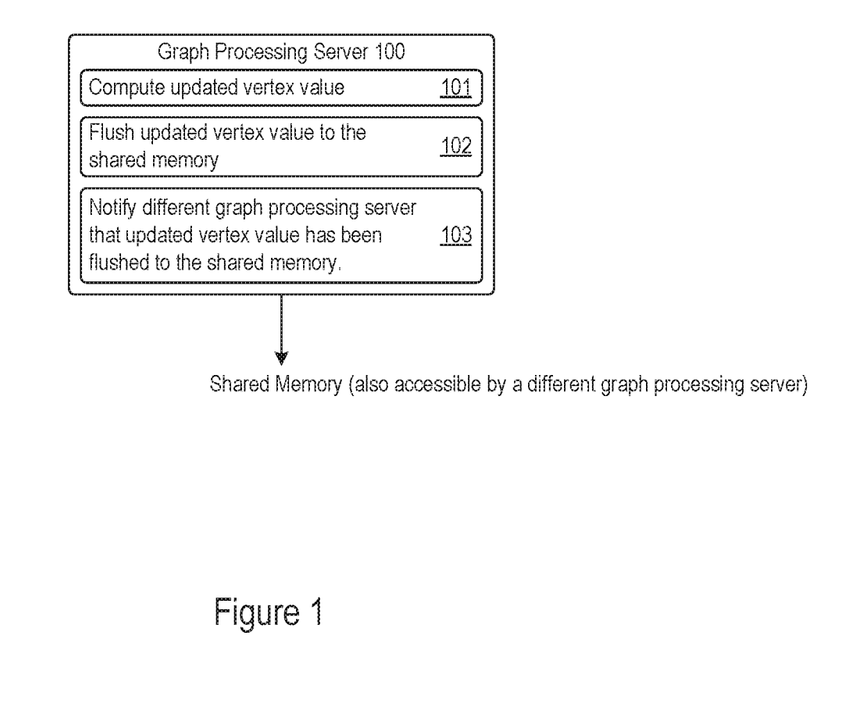
FIG. 1 shows an example of a graph processing server that supports flushing a graph update to a shared memory.

FIG. 1 shows an example of a graph processing server 100 that supports flushing a graph update to a shared memory. The graph processing server 100 may be implemented as part of a computing device, and may thus include circuitry, logic, storage medium, executable instructions, or any combination of processing elements to implement the features discussed herein. In some examples, the graph processing server 100 is implemented as a part of a distinct computing device, separate from other graph processing servers. Thus, the graph processing server 100 may employ a distinct operating system, maintain a distinct local memory, and implement a distinct set of input/output interfaces separate from other graph processing servers. The graph processing server 100 may be implemented as part of a data center or data processing system, such as one of multiple graph processing servers that collectively process input data.

The examples below focus on input data in the form of an input graph, including graph portions assigned for processing to separate graph processing servers. Computation or processing of an input graph by a data processing system or graph processing servers may be referred to as a graph update process. However, the graph processing server 100 may process any form of input data according to the features described herein.

The graph processing server 100 may be communicatively linked to a shared memory. The shared memory may be a non-volatile memory, for example, and may be also accessible to a different graph processing server. The shared memory may provide a shared storage medium for any number of devices, servers, or other processing entities.

Multiple graph processing servers in a data processing system may access the shared memory as part of a graph update process. As described in greater detail below, the multiple graph processing servers may utilize the shared memory as a medium for communicating graph updates (e.g., computation results, updated vertex values, etc.). As one example, the graph processing server 100 may flush a graph update to the shared memory. Flushing data may include writing data (e.g., the graph update) from the graph processing server 100 to the shared memory, for example so a different graph processing server can retrieve the written data. As seen in FIG. 1, the graph processing server 100 includes the modules 101, 102, and 103, which may be implemented as logic, circuitry, executable instructions, and the like. Through the modules 101-103, the graph processing server 100 may compute an updated vertex value for a graph portion handled by the graph processing server 100; flush the updated vertex value to the shared memory for retrieval by a different graph processing server (for example as part of a graph update log); and notify the different graph processing server indicating that the updated vertex value has been flushed to the shared memory. The graph processing server 100 may support retrieving of a graph update (e.g., generated by another graph processing server) from the shared memory as well.

Caches of the multiple graph processing servers may be non-coherent with respect to one another, as in some examples hundreds or thousands of graph processing servers or other computing devices may share access to the shared memory. In some examples, the graph processing server 100 include a caches that is non-coherent with respect to a cache of a different processing server. The graph processing server 100 may ensure a graph update is written to the shared memory before notifying the different graph processing server that the graph update is available for retrieval.

Figure 2:
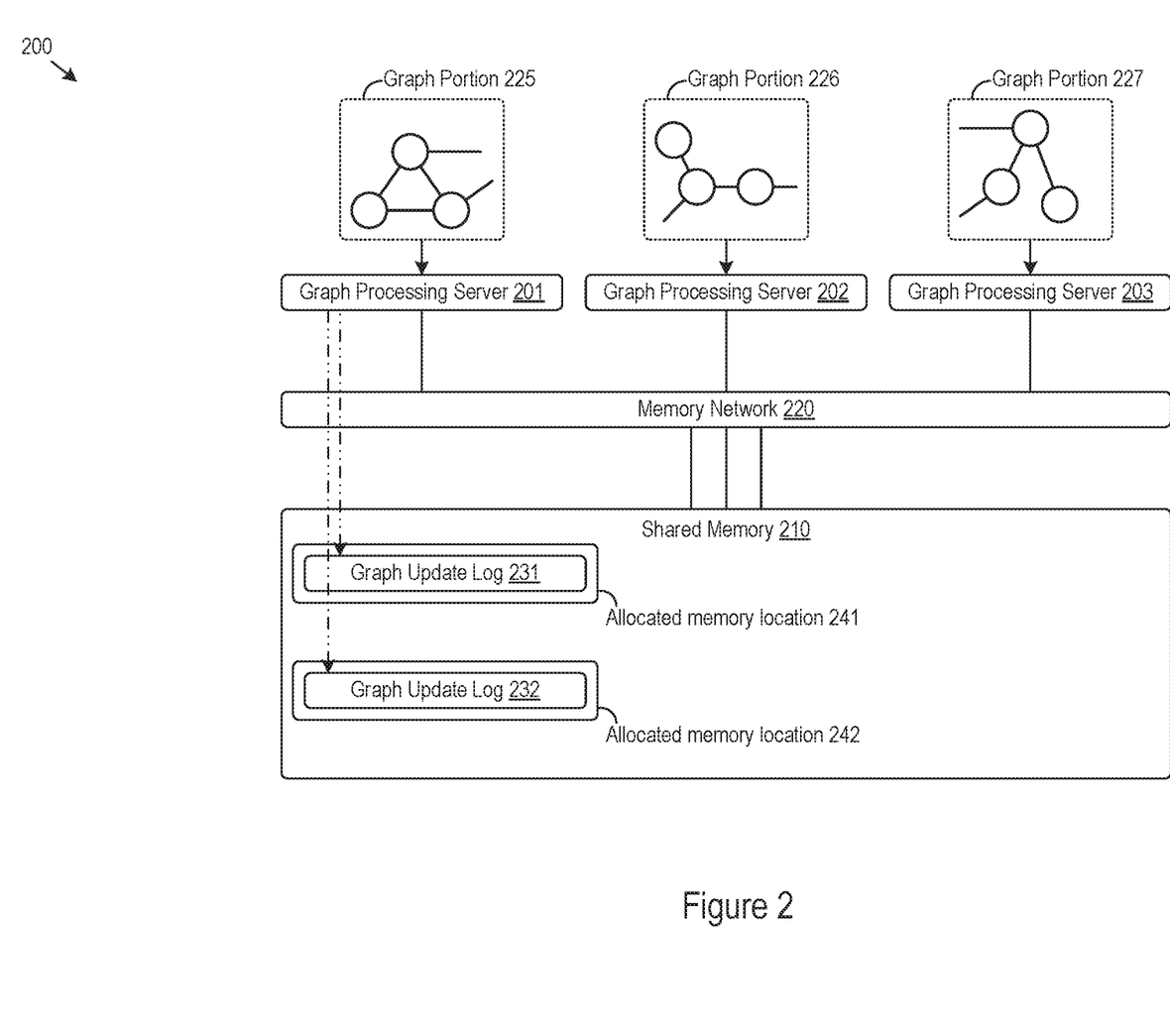
FIG. 2 shows an example of a graph processing server flushing a graph update to a shared memory.

FIG. 2 shows an example of a graph processing server flushing a graph update to a shared memory. In particular, FIG. 2 includes the graph processing servers labeled as 201, 202, and 203, which are communicatively linked to a shared memory 210 through a memory network 220. The graph processing servers 201-203, the shared memory 210, the memory network 220, or any combination thereof may be part of a rack-scale system that implements a data processing system. As another example, the graph processing servers 201-203 may be implemented through respective compute nodes in a processing system, that access the shared memory 210 through the memory network 220.

The shared memory 210 may implement a shared memory namespace accessible to multiple graph processing servers, such as the graph processing servers 201-203. Local storage mediums of the graph processing servers 201-203, such as a data cache, may be non-coherent with one another. Thus, the graph processing server 201 may include a cache that is non-coherent with respect to a cache of a different graph processing server, such as the graph processing server 202 or 203. The graph processing servers 201-203 may utilize the shared memory 210 as a communication medium to exchange (e.g., store and retrieve) graph updates computed during the graph update process.

In some examples, the shared memory 210 is byte-addressable, thus supporting access to a particular memory address or memory address range within the shared memory. In other examples, the shared memory is block addressable. A memory medium that implements the shared memory may be volatile or non-volatile. Thus, in some examples, the shared memory is a non-volatile computer storage medium, such as a non-volatile random access memory (RAM), a hard drive, flash memory, optical disk, memristor array, solid state drive, and the like. Access to the shared memory 210 may be controlled by the memory network 220, which may include a memory fabric or other circuitry for processing data requests to the shared memory 210 from the multiple physical or logical entities that the shared memory 210 is accessible to (e.g., compute nodes, graph processing servers, etc.)

Separate elements of a data processing system may process a particular portion of an input graph. For example, a graph processing server may process a specific portion of an input graph assigned to the graph processing server. Thus, an input graph may be divided into portions that are assigned and processed by multiple graph processing servers. In the example shown in FIG. 2, the graph processing server 201 processes the graph portion 225, the graph processing server 202 process the graph portion 226, and the graph processing server 203 processes the graph portion 227. The graph portions 225, 226, and 227 may form part or all of an input graph being processed by a data processing system. In processing the graph portions 225-227 respectively, the graph processing servers 201-203 may perform computations for the graph update process in parallel or synchronously.

In some examples, the graph processing servers 201-203 perform the graph update process through successive graph update iterations. A graph update iteration may include a computation phase, a flush phase, and a retrieve phase, each of which are discussed in greater detail below. In a continuing example with regards to FIGS. 2 and 3, the computation phase and the flush phase are presented with respect to the graph processing server 201 and the retrieve phase is presented with respect to the graph processing servers 201, 202, and 203.

In a computation phase, the graph processing server 201 may process an assigned graph portion to compute a graph update. A graph update computed by the graph processing server 201 may include updates to a vertex value, a graph edge, or any other aspect of the graph portion 225. In some examples, the graph processing server 201 buffers the graph update in a local memory of the graph processing server 201 itself, such as a DRAM (not shown) of a compute node implementing the graph processing server 201. Thus, the graph processing server 201 may, in a subsequent flush phase, flush updated vertex values or other graph updates from the local memory to the shared memory 210, which may serve as a non-cache-coherent exchange medium between the multiple graph processing servers.

Upon computing the graph update, the graph processing server 201 may enter a flush phase. Through the flush phase, the graph processing server 201 may communicate selected portions of the graph update to other graph processing servers, such as updated vertex values that impact computation for other graph portions handled by the other graph processing servers. Thus, in the flush phase, the graph processing server 201 may flush some or all of the graph update to the shared memory 210 (e.g., by flushing specific vertex values updated in the computation phase). In this way, the graph processing server 201 may propagate updated values computed by the graph processing server 201 for retrieval by other graph processing servers for use in processing other graph portions of the input graph. By utilizing the shared memory 210 as a communication medium, the graph processing server 201 may reduce delay or latency in propagating updated values for the graph update process. For example, the graph processing server 201 may flush graph updates (e.g., graph update logs) to the shared memory 210 without introducing delay for communication over a packet-based communication network. Doing so may increase processing efficiency, as packet-based communications may be multiple orders of magnitude slower than utilizing the shared memory 210 as a communication medium to exchange graph updates. As the amount of graph update data communicated between graph processing servers increases, the greater the efficiency, energy conservation, and latency improvement the graph update flushing to the shared memory 210 may provide.

In flushing a graph update to the shared memory 210, the graph processing server 201 may generate a graph update log. The graph update log may include updated vertex values relevant to, affecting, or otherwise impacting another graph portion processed by a different graph processing server. For example, an updated vertex value in the graph portion 225 processed by the graph processing server 201 may alter a vertex value or graph update computation for the graph portion 225 handled by the graph processing server 202. Thus, the graph processing server 201 may generate a graph update log specifically for a different graph processing server (e.g., the graph processing server 202) that includes updated vertex values relevant to the specific graph portion processed by the different graph processing server. The graph update log may batch together specifically relevant vertex updates for the different graph processing server, and may exclude (or not include) vertex updates that do not impact, correspond to, or otherwise affect the specific graph portion processed by the different graph processing server.

An updated vertex value may impact another graph portion that is adjacent to a particular graph portion processed by a graph processing server. An adjacent graph portion with respect to a particular graph portion may refer to a different graph portion with an edge that links to the particular graph portion. Thus, in the context of the example shown in FIG. 2, the graph portions 225 and 226 may be adjacent with respect to one another when a graph edge links a vertex in the graph portion 225 to a vertex in the graph portion 226. To illustrate, the graph portion 226 and the graph portion 227 may each be adjacent to the graph portion 225 handled by the graph processing server 201.

The graph processing server 201 may generate a graph update log specifically for another graph processing server handling a graph portion adjacent to the graph portion 225 handled by the graph processing server 201. When the graph portions 226 and 227 are adjacent to the graph portion 225, the graph processing server 201 may generate a graph update log specifically for the graph processing server 202 (handling the graph portion 226) and for the graph processing server 203 (handling the graph portion 227), shown in FIG. 2 as the graph update logs 231 and 232 respectively. In generating the graph update log 231 specifically for the graph processing server 202, the graph processing server 201 may batch updated vertex values (or other graph updates) computed for the graph portion 225 and affecting the adjacent graph portion 226, such as by altering a vertex value or computation for the adjacent graph portion 226. Along similar lines, the graph processing server 201 may generate the graph update log 232 to specifically include updated vertex values that impact the graph portion 227 handled by the graph processing server 203. In some examples, the graph processing server 201 generates a separate and specific graph update log for each other graph processing server handling a graph portion adjacent to the graph portion 225 (which may vary in different iterations as edges and vertexes change values, are added, or are removed from the graph).

The graph processing server 201 may flush a graph update log to a specific portion of the shared memory 210. That is, specific portions of the shared memory 210 may be allocated for storing specific graph update logs (e.g., generated by a first graph processing server for a second graph processing server). For example, a particular address range or space in the shared memory 210 may be allocated to the graph processing server 201 for flushing a graph update log specifically for a different graph processing server (which may vary over time as memory addresses and ranges are assigned and reassigned). As seen in FIG. 2, the graph processing server 201 flushes the graph update log 231 (generated specifically for the graph processing server 202) to the allocated memory location 241. Along similar lines, the allocated memory location 242 is designated for the graph processing server 201 to flush the graph update log 232 generated for the graph processing server 203.

To further illustrate, for a data serving system with 'N' number of graph processing servers to process an input graph, the shared memory 210 may allocate 'N−1' number of locations for a particular graph processing server to store update logs generated for (up to) the 'N−1' other graph processing servers processing the input graph. In this illustration, the particular graph processing server may create up to 'N−1' graph update logs for a particular iteration (e.g., if each of the 'N−1' other graph processing servers handle a graph portion adjacent to the graph portion handled by the particular graph processing server). Thus, the shared memory 210 may allocate the 'N−1' memory locations to ensure sufficient space for storing up to 'N−1' graph update logs generated by the particular graph processing server. The allocated locations in the shared memory 210 for storing graph update logs may be requested through a client application, configured by the graph processing server itself, or set through a system administrator or memory control entity.

Figure 3:
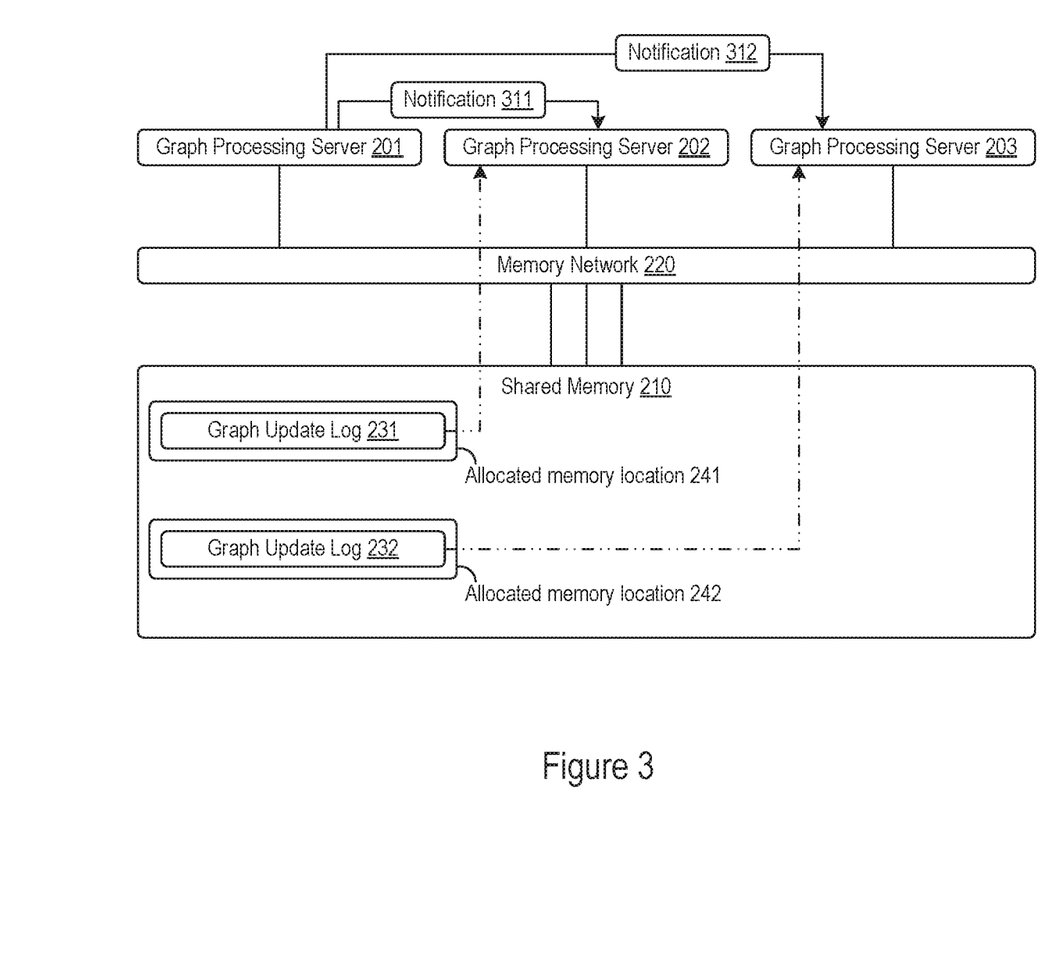
FIG. 3 shows an example of a graph update retrieval from a shared memory by a graph processing server.

The graph processing server 201 may complete the flush phase after graph update logs generated for other graph processing servers have been flushed to the allocated portions of the shared memory 210. Next, the graph processing server 201 may enter a retrieve phase. In the retrieve phase, a graph processing server may send retrieval notifications, receive retrieval notifications, and retrieve graph update logs. Example implementations of these features are described through FIG. 3. FIG. 3 shows an example of a graph update retrieval from a shared memory by a graph processing server.

The graph processing server 201 may send a retrieval notification to another graph processing server for which the graph processing server 201 generated a graph update log. In the example shown in FIG. 3, the graph processing server 201 has generated and flushed the graph update log 231 for retrieval by the graph processing server 202 as well as the graph update log 232 for retrieval by the graph processing server 203. Accordingly, the graph processing server 201 may send a retrieval notification to the graph processing servers 202 and 203, shown in FIG. 3 as the notifications 311 and 312 respectively. The graph processing server 201 may generate a retrieval notification to indicate, for example, a number of vertex updates included in generated graph update log, which may allow the graph processing server retrieving the graph update log to determine a particular data amount to retrieve from the shared memory 210 to retrieve the relevant vertex updates. In some examples, the graph processing server 201 indicates in the graph update log itself a number of updated vertex values included in the graph update log.

The graph processing server 201 may notify another graph processing server regarding the availability of a flushed graph update log in various ways. In some examples, the graph processing server 201 communicates a retrieval notification message (e.g., the retrieval notifications 311 and 312 shown in FIG. 3). Communication of a retrieval notification message may be accomplished through a dedicated control channel, across a communication network linking the graph processing server, or through any other communication mechanisms between the servers. In some examples, the graph processing server 202 (or graph processing server 203) may poll a particular location in the shared memory 210 that implements a notification flag. When the notification flag is set, the graph processing server 202 may recognize that a graph update log generated for the graph processing server 202 is available for retrieval. Thus, in this example, the graph processing server 201 may notify the graph processing server 202 that the graph update log 231 is available for retrieval by setting the notification flag in the shared memory 210.

In response to receiving a retrieval notification, a graph processing server may retrieve the corresponding graph update log from the shared memory 210. The retrieved graph update log may include updated vertex values from a different graph portion computed during a current graph update iteration. In the example shown in FIG. 3, the graph processing server 202 may retrieve the graph update log 231, which may include updated vertex values computed from the graph portion 225 by the graph processing server 201. The graph processing server 202 may utilize the updated vertex values from the graph portion 225 in computing a graph update for the graph portion 226 in a subsequent iteration (e.g., during the next compute phase). A graph processing server may retrieve multiple graph update logs, generated by multiple different graph processing servers processing other graph portions adjacent to an assigned graph portion. Upon retrieving graph update logs generated for itself, a graph processing server may complete the retrieval phase of the graph update iteration.

As described above, a graph processing server may complete a graph update iteration that includes a computation phase, flush phase, and retrieval phase. A graph processing server may perform some or all of the features for the various phases discussed above in a particular graph update iteration. For example, in a particular iteration, the graph processing server 201 may perform any combination of the following: compute updated vertex values for the graph portion 225 handled by the graph processing server 201, flush specifically generated graph update logs respectively including relevant vertex updates for other graph processing servers processing adjacent graph portions, send notifications to the other graph processing servers for which a graph update log was generated by the graph processing server 201, and receive notifications from other graph processing servers in response to which the graph processing server 201 retrieves, from the shared memory 210, graph update logs generated specifically for the graph processing server 201. The graph processing server 201 may start a next graph update iteration upon retrieving the graph update logs generated specifically for the graph processing server 201, e.g., by starting a next computation phase computing a subsequent vertex update using retrieved graph update logs.

Figure 4:
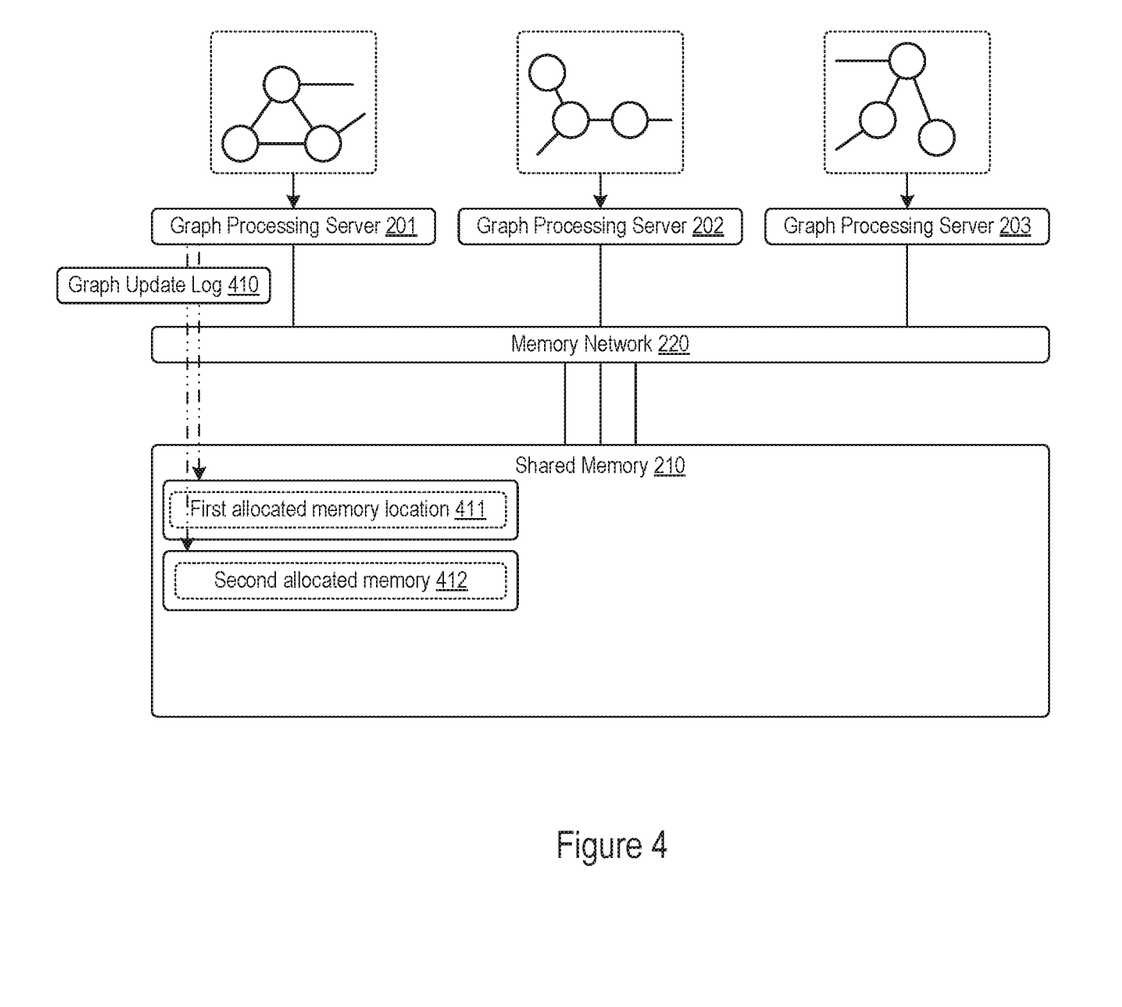
FIG. 4 shows an example of flushing a graph update log to alternating locations in a shared memory.

FIG. 4 shows an example of flushing a graph update log to alternating locations in a shared memory. In successive iterations for the graph update process, a graph processing server may alternate the location in the shared memory to which it flushes a particular graph update log. To illustrate, the graph processing server 201 in FIG. 4 may process a particular graph portion to generate the graph update log 410. The graph update log 410 may batch vertex updates relevant to an adjacent graph portion handled by the graph processing server 202. In a first graph update iteration, the graph processing server 201 may flush the graph update log 410 computed for that iteration to a first allocated memory location 411 in the shared memory 210. The first allocated memory location 411 may provide for a memory buffer allocated to store the graph update log 410 generated specifically for the graph processing server 202 by the graph processing server 201.

In a subsequent graph update iteration, the graph processing server 201 may alternate the location in the shared memory 210 to which the graph update log 410 is flushed. Thus, in the next graph update iteration, the graph processing server 201 may flush the graph update log 410 generated for that iteration to a second allocated memory location 412 in the shared memory 210, where the second allocated memory location 412 may also provide a memory buffer allocated to store the graph update log 410 generated specifically for the graph processing server 202 by the graph processing server 201. Thus, the graph processing server 201 may alternate locations in the shared memory to which the graph update log 410 is flushed in successive graph update iterations of the graph update process. While two alternating locations are shown in FIG. 4 through the first allocated memory location 411 and the second allocated memory location 412, the shared memory 210 may allocate any number of different locations for alternating storage of a particular graph update log generated by the graph processing server 201.

By alternating between allocated locations in the shared memory 210 for storing a graph update log in successive graph update iterations, the graph processing server 201 may reduce or avoid race conditions among different graph update servers. In particular, the graph processing server 201 may prevent a scenario where the graph update log generated from a previous iteration is overwritten by the graph update log generated for a current iteration before retrieval by another graph processing server. Such a scenario may arise when different graph processing servers operate at different speeds, and a graph processing server operating at a slower relative speed takes longer to retrieve a graph update log from the shared memory 210.

Figure 5:
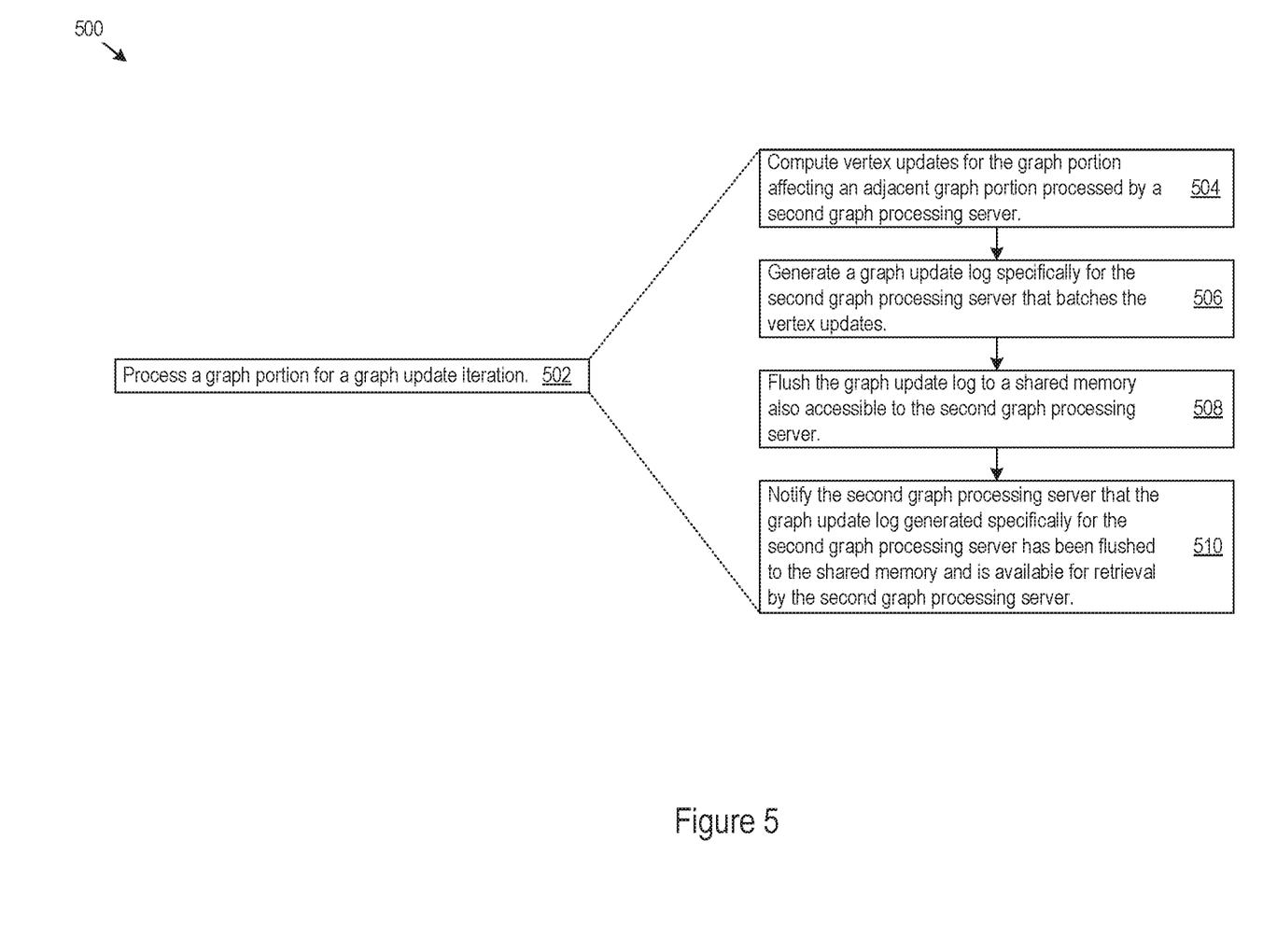
FIG. 5 shows an example of logic that the graph processing server may implement.

FIG. 5 shows an example of logic 500 that a graph processing server may implement. A graph processing server may implement the logic 500 as hardware and/or machine-readable instructions, for example. Executing the logic 500 as a process or method may support the graph processing server in flushing a graph update to shared memory. Description of the logic 500 is provided below with respect to a first graph processing server performing the logic 500.

The first graph processing server may process a graph portion for a graph update iteration (502). The graph update iteration may be one of multiple iterations in a graph update process performed by a data processing system. In processing the graph portion for the graph update iteration, the first graph processing server may compute vertex updates for the graph portion that affect an adjacent graph portion processed by a second graph processing server (504). The first graph processing server may generate a graph update log specifically for the second graph processing server that batches the vertex updates (506).

The first graph processing server may flush the graph update log to a shared memory also accessible to the second graph processing server (508). The first graph processing server may flush the graph update log for the second graph processing server to a particular location in the shared memory, such as a particular memory location allocated for the graph update log. The first graph processing server may flush multiple graph update logs, and may thus flush another graph update log generated specifically for a third graph processing server to another location in the shared memory. For a graph update log generated for a specific graph processing server, the first graph processing server flushes the graph update log to alternating locations in the shared memory for successive graph update iterations. As noted above, doing so may reduce or avoid race conditions among different graph update servers and prevent overwriting of a graph update log for a subsequent graph update iteration that has yet to be retrieved from the shared memory for the current graph update iteration.

Upon flushing the graph update log to the shared memory, the first graph processing server may notify the second graph processing server that the graph update log specifically generated for the second graph processing server has been flushed to the shared memory and is available for retrieval by the second graph processing server (510). The notification may specify a number of vertex updates that are batched together in the graph update log. The first graph processing server may also receive a notification from another graph processing server to retrieve a graph update log from the shared memory. As one example, the first graph processing server may receive a notification that a graph update log generated specifically for the first graph processing server by the second graph processing server is available in the shared memory. In response, the first graph processing server may retrieve the graph update log generated specifically for the first graph processing server from a particular allocated memory location in the shared memory.

Figure 6:
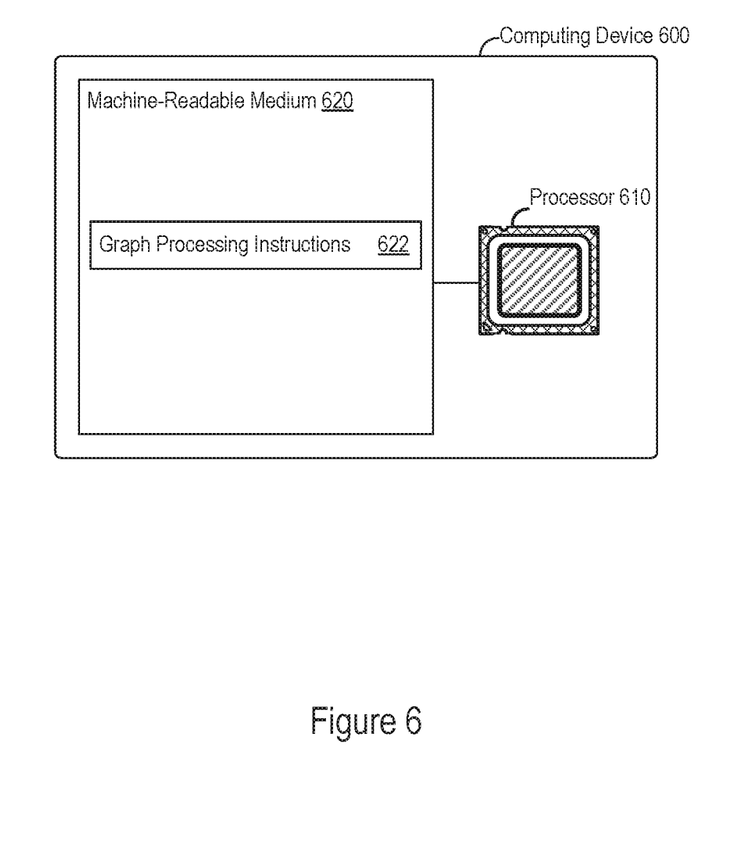
FIG. 6 shows an example of a computing device that supports a graph update flush to a shared memory.

FIG. 6 shows an example of a computing device 600 that supports a graph update flush to a shared memory. In that regard, the computing device 600 may implement any of the features described herein, including any feature described above with respect to a graph processing server.

The computing device 600 may include a processor 610. The processor 610 may include a central processing unit (CPU), microprocessor, and/or any hardware device suitable for executing instructions stored on a computer-readable medium. The computing device 600 may include a machine-readable medium 620. The machine-readable medium 620 may be any electronic, magnetic, optical, or other physical storage device that stores executable instructions, such as the graph processing instructions 622 shown in FIG. 6. Thus, the machine-readable medium 620 may be, for example, Random Access Memory (RAM), an Electrically-Erasable Programmable Read-Only Memory (EEPROM), a storage drive, an optical disk, and the like.

The computing device 600 may execute instructions stored on the machine-readable medium 620 through the processor 610. Executing the instructions may cause the computing device 600 to perform according to any of the features described herein. One specific example is shown in FIG. 6 through the graph processing instructions 622. Executing the graph processing instructions 622 may cause the computing device 600 to compute vertex updates for a graph portion assigned to a first graph processing server; flush the vertex updates to a shared memory accessible to a second graph processing server assigned to process an adjacent graph portion, including: batching, from among the vertex updates, particular vertex updates in the graph portion that affect the adjacent graph portion assigned to the second graph processing server into a first graph update log; and flushing the first graph update log to a predetermined location of the shared memory. The predetermined location in the shared memory may include a first allocated memory location and a second allocated memory allocation and the graph processing instructions 622 may further cause the computing device 600 to alternate between flushing subsequent graph update logs for the second graph processing server to the first allocated memory location and to the second allocated memory location Executing the graph processing instructions 622 may also cause the computing device 600 to notify the second graph processing server that the first graph update log has been flushed to the shared memory and is available for retrieval. In some examples, the graph processing instructions 622 are further to retrieve a second graph update log from the shared memory, the second graph update log flushed by the second graph processing server to the shared memory for retrieval by the first graph processing server and compute a subsequent vertex update for the graph portion assigned to the first graph processing server using the second graph update log retrieved from the shared memory. In some examples, the graph processing instructions 622 are further executable to retrieve a second graph update log from the shared memory after notifying the second graph processing server that the first graph update log has been flushed to the shared memory. The second graph update log may have been flushed by the second graph processing server to the shared memory and include a vertex update for the adjacent graph portion impacting the graph portion assigned to the first graph processing server.

The methods, devices, systems, and logic described above, including any graph processing server, may be implemented in many different ways in many different combinations of hardware, software or both hardware and software. For example, a graph processing server may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a non-transitory or tangible storage medium and computer readable instructions stored on the medium, which when executed in an endpoint, computer system, or other device, cause the device to perform operations according to any of the description above.

The processing capability of the systems, devices, and circuitry described herein, including a graph processing server, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various examples have been described above, many more implementations are possible.

The invention claimed is:

1. A system comprising:
a graph processing server, the graph processing server communicatively linked to a shared memory also accessible to a plurality of graph processing servers such that the graph processing server and the plurality of graph processing servers perform distributed processing of an input graph, wherein the input graph is divided into specific graph portions and the graph processing server and each of the plurality of graph processing servers are assigned to handle processing of a different specific graph portion of the input graph, the graph processing server comprising:
a processor; and
a storage medium storing executable instructions, that when executed, cause the processor to:
compute an updated vertex value for the specific graph portion assigned to be handled by the graph processing server;
compute multiple updated vertex values for the specific graph portion assigned to be handled by the graph processing server, including the updated vertex value;
batch the multiple updated vertex values into a graph update log; and
flush the graph update log to the shared memory for retrieval by the plurality of graph processing servers; and
notify the plurality of graph processing servers indicating that the graph update log has been flushed to the shared memory.

2. The system of claim 1, wherein the graph processing server is to notify the plurality of graph processing servers by transmitting a notification message through a control channel linking the graph processing server to the plurality of graph processing servers.

3. The system of claim 1, wherein the graph processing server is further to indicate in the graph update log a number of updated vertex values included in the graph update log.

4. The system of claim 1, wherein the graph processing server includes a cache that is non-coherent with a cache of the different plurality of graph processing servers.

5. The system of claim 1, wherein the graph processing server is to notify the plurality of graph processing servers by setting a notification value in the shared memory polled by the plurality of graph processing servers.

6. A method comprising:
processing, by a first graph processing server, a specific graph portion of an input graph that is distributedly processed by the first graph processing server and a plurality of graph processing servers, wherein the input graph is divided into specific graph portions and the first graph processing server and each of the plurality of graph processing servers are assigned to handle processing of a different specific portion of the input graph, and wherein the first graph processing server can perform a graph update iteration by:
computing vertex updates for the specific graph portion assigned to be handled by the first graph processing server and affecting an adjacent graph portion processed by a second graph processing server from the plurality of graph processing servers;
generating a graph update log specifically for the second graph processing server that batches the vertex updates;
flushing the graph update log to a shared memory also accessible to the plurality of graph processing servers including the second graph processing server; and
notifying the second graph processing server that the graph update log generated specifically for the second graph processing server has been flushed to the shared memory and is available for retrieval by the plurality of graph processing servers including the second graph processing server.

7. The method of claim 6, further comprising:
receiving a notification that a graph update log generated specifically for the first graph processing server by the second graph processing server is available in the shared memory; and, in response:
retrieving the graph update log generated specifically for the first graph processing server from a particular allocated memory location in the shared memory.

8. The method of claim 6, wherein notifying the second graph processing server comprises specifying a number of vertex updates that are batched in the graph update log.

9. The method of claim 6, further comprising flushing the graph update log to alternating locations in the shared memory for successive graph update iterations.

10. The method of claim 6, comprising flushing the graph update log for the second graph processing server to a particular location in the shared memory; and further comprising:
flushing another graph update log generated specifically for a third graph processing server from the plurality of graph processing servers to another location in the shared memory.

11. A non-transitory machine readable medium storing executable instructions to:
compute vertex updates for a specific graph portion of an input graph that is distributedly processed by the first graph processing server and a plurality of graph processing servers, wherein the input graph is divided into specific graph portions and the first graph processing server and each of the plurality of graph processing servers are assigned to handle processing of a different specific portion of the input graph;
flush the vertex updates to a shared memory accessible to a second graph processing server from the plurality of graph processing servers assigned to process an adjacent graph portion, including:
batching, from among the vertex updates, particular vertex updates in the specific graph portion that affect the adjacent graph portion assigned to the second graph processing server into a first graph update log; and
flushing the first graph update log to a predetermined location of the shared memory; and
notify the plurality of graph processing servers including the second graph processing server that the first graph update log has been flushed to the shared memory and is available for retrieval.

12. The non-transitory machine readable medium of claim 11, wherein the executable instructions are further to, after notifying the second graph processing server that the first graph update log has been flushed to the shared memory:
retrieve a second graph update log from the shared memory, the second graph update log flushed by the second graph processing server to the shared memory and including a vertex update for the adjacent graph portion impacting the specific graph portion assigned to be handled by the first graph processing server.

13. The non-transitory machine readable medium of claim 11, wherein the executable instructions are further to:
retrieve a second graph update log from the shared memory, the second graph update log flushed by the second graph processing server to the shared memory for retrieval by the first graph processing server and the plurality of graph processing servers; and
compute a subsequent vertex update for the specific graph portion assigned to be handled by the first graph processing server using the second graph update log retrieved from the shared memory.

14. The non-transitory machine readable medium of claim 11, wherein predetermined location in the shared memory includes a first allocated memory location and a second allocated memory location; and wherein the executable instructions are further to alternate between flushing subsequent graph update logs for the second graph processing server to the first allocated memory location and to the second allocated memory location.

* * * * *